(12) United States Patent
Trezza

(10) Patent No.: US 6,788,895 B2
(45) Date of Patent: Sep. 7, 2004

(54) SECURITY MAPPING AND AUTO RECONFIGURATION

(75) Inventor: John A. Trezza, Nashua, NH (US)

(73) Assignee: Altera Corporation, Santa Clara, CA (US)

( * ) Notice: Subject to any disclaimer, the term of this patent is extended or adjusted under 35 U.S.C. 154(b) by 672 days.

(21) Appl. No.: 09/732,974

(22) Filed: Dec. 8, 2000

(65) Prior Publication Data

US 2001/0030782 A1 Oct. 18, 2001

Related U.S. Application Data

(60) Provisional application No. 60/170,149, filed on Dec. 10, 1999.

(51) Int. Cl.[7] .................................................. G02B 6/38

(52) U.S. Cl. ................... 398/9; 398/10; 398/2; 398/57

(58) Field of Search ................................ 398/141, 161, 398/1–8, 45–48, 57; 438/24, 26, 29, 22, 107, 27; 385/15, 31, 52, 89

(56) References Cited

U.S. PATENT DOCUMENTS

| | | | |
|---|---|---|---|
| 4,682,323 A | | 7/1987 | Corfield et al. |
| 5,200,631 A | | 4/1993 | Austin et al. |
| 5,241,610 A | | 8/1993 | Labiche et al. |
| 5,420,954 A | | 5/1995 | Swirhun et al. |
| 5,428,704 A | | 6/1995 | Lebby et al. |
| 5,506,383 A | | 4/1996 | Chen |
| 5,568,574 A | | 10/1996 | Tanguay, Jr. et al. |
| 5,625,734 A | | 4/1997 | Thomas et al. |
| 5,631,988 A | | 5/1997 | Swirhun et al. |
| 5,638,469 A | | 6/1997 | Feldman et al. |
| 5,748,818 A | | 5/1998 | Weiss et al. |
| 5,757,425 A | * | 5/1998 | Barton et al. ............... 348/241 |
| 5,761,350 A | | 6/1998 | Koh |
| 5,857,042 A | | 1/1999 | Robertson et al. |
| 5,858,814 A | | 1/1999 | Goossen et al. |

(List continued on next page.)

OTHER PUBLICATIONS

PCT International Search Report dated Apr. 3, 2001 of International Application No. PCT/US00/33514 filed Dec. 11, 2000.

PCT International Search Report dated Apr. 4, 2001 of International Application No. PCT/US00/33247 filed Dec. 8, 2000.

Krishnamoorthy, Ashok V., Firehose Architectures for Free–Space Optically Interconnected VLSI Circuits, SPECIAL Issue on Parallel Computing with Optical Interconnects, Journal of Parallel and Distributed Computing, Nov. 1996, pp. 1–10 complete article also see marked up cover and p. 6 included.

(List continued on next page.)

*Primary Examiner*—Leslie Pascal
*Assistant Examiner*—David Payne
(74) *Attorney, Agent, or Firm*—Maine & Asmus

(57) ABSTRACT

In a semiconductor device comprising photo-transceiver arrays constructed on silicon substrates with underlying supporting CMOS circuitry in the substrate interfacing with a source of software control, a method is provided for mapping and reconfiguring the global data transfer channel map of optical interconnect lines and intra-nodal routing links. An initial mapping procedure identifies all possible connections. The silicon circuitry provides for sensing optical connections and light levels, for testing or sensing of routing links, and for controlling gain and power, as well as forming and reforming routing links between detectors and emitters. A rule-based routing, mapping and re-mapping scheme, utilizing over-sampling techniques and effectuated by the silicon circuitry and software, accommodates limited misalignment of mating photo-arrays, faults occurring in data transmission channels after the initial mapping, and provides additional security, performance and power management capabilities.

20 Claims, 8 Drawing Sheets

U.S. PATENT DOCUMENTS

| | | |
|---|---|---|
| 5,896,213 A | 4/1999 | Nagahori et al. |
| 5,909,303 A | 6/1999 | Trezza et al. |
| 5,923,796 A | 7/1999 | Feldman et al. |
| 5,930,588 A | 7/1999 | Paniccia |
| 6,025,206 A | 2/2000 | Chen et al. |
| 6,096,567 A | 8/2000 | Kaplan et al. |

OTHER PUBLICATIONS

Travers, Christine M. et al., VLSI Photonic Smart Pixel Array for I/O System Architectures, pub Jan. 1998, This is best copy found.

Kitayama, Ken–Ichi et al, Two Dimensional Parallel Optical Data Link: Experiment* IEEE, 1996 pp. 206–214.

Neff, John A. et al. VCSEL/CMOS Smart Pixel Arrays for Free Space Optical Interconnects, IEEE 1996 pp. 282–289.

Kosaka, Hideo et al., Plastic–Based Receptacle–Type VCSEL–Array Modules with One and Two Dimensions Fabricated Using the Self Allignment Mounting Technique, IEEE 1987 or 1997 pp. 382–385 This is best copy found.

No Author, ————Smart Pixel Array (SPA) for VLSI–Photonics, DARPA website, this is the best copy found.

M. Ajmone Marsan et al, Modelling Slotted Multi–Channel Ring All–Optical Networks, *IEEE*, 1997, pp. 146–153.

Marco Ajmone Marsan et al, Access Protocols for Photonic WDM Multi–Rings with Tunable Transmitters and Fixed Receivers, *SPIE*, pp. 59–72, vol. 26921.

Carl Beckmann, Applications: Asynchronous Transfer Mode and Synchronous Optical Network, *Handbook of Fiber Optic Data Communication*, 1998, pp. 385–414, Academic Press.

Floyd E. Ross, An Overview of FDDI: The Fiber Distributed Data Interface, *IEEE Journal on Selected Areas in Communications*, Sep. 1989, pp. 1043–1051, vol. 7 No. 7.

* cited by examiner

SECURITY MAPPING AND AUTO RECONFIGURATION

CROSS REFERENCE TO RELATED APPLICATIONS

This application relates and claims priority to pending U.S. application Ser. No. 60/170,149, filed Dec. 10, 1999.

BACKGROUND OF THE INVENTION

1. Technical Field of the Invention

This invention relates to semiconductor photo transceiver arrays with silicon circuitry permitting selectable routing of detectors to emitters, and to methods for routing and mapping data channels in opto-electronic semiconductor devices; and in particular to methods for routing, mapping, rerouting and re-mapping internal and optical interconnections in multi-array semiconductor devices and systems.

2. Background Art

The technology associated with electronics has evolved extremely rapidly over the last 40 years. Computers and related peripheral equipment, satellite and communication systems are becoming ever more sophisticated and powerful. However, data transfer into and out of processors remains a gating capability. The combination of increased parallelism and optics is the focus of optical interconnect technology.

One approach to optical interconnect technology uses so-called flip-chip techniques where the advantages of silicon process technology are combined with the optical properties of III-V semiconductor materials. Results to date indicate that this combination will lead to orders of magnitude increases in data transfer rates. These successes suggest that there will be enormous benefits to resolving the remaining issues associated with this technology.

Prior art FIG. 1 shows an example of so-called flip-chip technology that has been developed to exploit the advantages of CMOS substrates for some aspects of data transfer, and the optical advantages of III-V semiconductors. In this technology, emitter-detector arrays are fabricated separately from a CMOS substrate. The emitter-detector arrays are then inverted, aligned with the CMOS substrates, and secured in place using solder balls or bumps to form electrical contacts with modest mechanical adhesion properties, and using epoxy to rigidly mount the emitter-detector array to the CMOS chip. In FIG. 1, for clarity only a single pair of fiber optic cables is shown.

The separate arrays of detectors and emitters are interconnected by some suitable light carrying media, such as bundles of fiber optic cables. The alignment between the ends the these bundles, or other media, and the arrays causes errors in mapping of the elements of one array with the elements of another array.

With whatever method one uses to connect one array of transmitters to an array of receivers, or one array of transceivers to another array of transceivers, alignment is an issue. In other words, what is needed is a way to determine that the arrays are aligned to produce a useful device.

Assembly processes are imperfect, so there will be some misalignment, even if the effect on the performance of the system is negligible. In a production environment the effect of small amounts of misalignment will decrease yield, which costs money in terms of lost revenue.

Prior art FIG. 2 shows a schematic representation of the effect of misalignment. The darker squares represent light from fibers coupled to the transceivers in a remote array, and the lighter squares represent the transceivers in the present array. In FIG. 2A there is some degradation of coupling, but a one-to-one correspondence between transceivers remains. However, in FIG. 2B, some of the light fibers overlap more than one transceiver, while others fail to overlap any transceivers. In general, the types of misalignment include rotation, linear displacement, scaling, and a combination of these three basic types of misalignment. What is needed is a way to increase the tolerance to slight misalignment of transceiver arrays when coupling arrays.

Connecting nodes requires the use of fiber bundles or some other point-to-point connection means. However, there will still be some amount of misalignment, which can cause system communication failures. What is needed is a way to increase the tolerance to slight misalignment of transceiver arrays when coupling nodes.

There would be only minimal utility to opto-electronic devices such as the ones shown in FIG. 1, if one array could be connected on only one other array. What is needed is a way to couple more than one array together.

If there is some misalignment between two transceivers, there will be an effect on other transceivers in other nodes. What is needed is a way to determine how the transceiver arrays are aligned in a ring or other network architecture so that channels can be assigned and correct data transfers between nodes in a network can occur.

In some applications, security of data transfer is critical. It is therefore very important to be able to ensure that data transfer is indeed secure. Therefore, what is needed is a way to increase the security with which data is transmitted from node to node.

Though small numbers of transceiver arrays consume modest amounts of power, large arrays consume copious quantities of power, and in so doing generate a lot of heat. Removing such large amounts of thermal energy is very challenging, but if the thermal load is not controlled the device may degrade prematurely. What is needed is a way to reduce the power consumed by a node.

Prior art that may provide useful context for the reader, includes the following:

U.S. Pat. No. 5,761,350, "Method and apparatus for providing a seamless electrical/optical multilayer micro-opto-electro-mechanical system assembly", illustrates how opto-electronic interconnections can provide a practical solution to communications bottleneck problems when combining a multitude of information processing units to perform a function. As research activities progress in the field of serial or parallel board-to-board and module-to-module interconnections, some of the research focus has shifted to smaller physical dimensions, such as intra-module interconnections, which combines opto-electronic interconnections, multi-chip module packaging, and micro-electromechanical systems (MEMS) technologies at the module level. This disclosure presents integrated optical input/output (I/O) couplers on multi-chip modules (MCMs) using micro-machined silicon mirrors that are used with opto-electronic multi-chip modules (OE-MCMs). It uses microstructures that integrate optical wave guide networks, multi-layer electrical transmission line networks, micro-machined silicon mirrors, and C4-bonded photonic devices into a single structure. Using both sides of the silicon wafers, multiple metal layers and optical waveguide layers are fabricated for all types of metal or optical waveguide materials. The input/output coupling arrangement utilizes a combination of micro-machined silicon mirrors and through-holes across OE-MCM, integrated together into a single package.

U.S. Pat. No. 5,625,734, "Opto-electronic interconnect device and method of making", describes a waveguide having a core region and a cladding region. A portion of the cladding region forms a first surface and portions of both the core region and the cladding region form an end surface. There is an insulative flexible substrate having an electrically conductive tracing with a first portion and a second portion, wherein the first portion of the insulative flexible substrate is mounted on the end surface of the waveguide.

U.S. Pat. No. 5,428,704, "Opto-electronic interface and method of making", describes an interconnect substrate having a surface with electrical tracings. There is a photonic device with a working portion and a contact electrically coupled to one of the electrical tracings disposed oil the interconnect substrate. A molded optical portion encapsulates the photonic device, forming a surface. The surface passes light between the photonic device and an optical fiber. Alignment of the optical fiber is achieved by an alignment apparatus that is formed in the molded optical portion.

U.S. Pat. No. 5,420,954, "Parallel optical interconnect", describes an optical interconnect that couples multiple optical fibers to an array of opto-electronic devices. The interconnect includes a multiple optical fiber connector and an opto-electronic board. The multiple fiber connector can be mechanically attached to or detached from the board.

U.S. Pat. No. 5,857,042, "Optical interconnection arrangements", describes an optical interconnection arrangement consisting of a plurality of parallel optical interconnection channels. In each channel, there are an optical source, an optical receiver, a first lens and a second lens. The first lens conveys light from the source to the second lens, and the second lens refocuses the light at the receiver. Each source and the associated first lens are offset one relative to the other by a predetermined distance in a direction transverse to an optical axis of the first lens. The corresponding receiver and the associated second lens are offset one relative to the other by the same distance but in the opposite direction to the offset between the source and first lens. Each offset is equal and opposite to the corresponding offset in an adjacent channel. With such an arrangement, if a leakage portion of a light beam from the first lens in one channel impinges on the second lens in an adjacent channel, the leakage portion will be refocused at a position which is spaced from the receiver of the adjacent channel.

In one embodiment, in each channel, the first lens and the second lens share a common optical axis and the source and receiver are offset relative to their common optical axis. In an alternative embodiment, the source and the receiver share a common optical axis and the first lens and the second lens are offset relative to their common optical axis. Such optical interconnection arrangements are tolerant of translational or rotational misalignments between the sources and associated first lenses on the one hand and the receivers and associated second lenses on the other hand, which is of particular advantage for free space optical interconnects or couplers.

U.S. Pat. No. 5,748,818, "Massive parallel optical interconnect system", describes a massive parallel (MP) connector which includes a fiber optic connector having a polymer ferrule having multiple fibers mounted in V-grooves of the ferrule and beveled edges of the ferrule providing for alignment of the ferrule when the MP fiber optic connector is mated to a receptacle with an alignment assembly and an alignment member mounted within the alignment assembly to provide for precision alignment. A receptacle assembly has a first receptacle half for receiving a fiber optic connector of a first form factor and a second receptacle half for receiving a fiber optic connector of a second form factor.

U.S. Pat. No. 5,631,988, "Parallel optical interconnect", describes an optical interconnect that couples multiple optical fibers to an array of opto-electronic devices. The interconnect includes a multiple optical fiber connector and an opto-electronic board. The multiple fiber connector can be mechanically attached to or detached from the board. The optical interconnect consists of a multiple optical fiber connector with a holder with a first planar surface, a plurality of optical fibers attached to the holder, each fiber having a first end abutting the first surface so as to expose the first end for receiving or transmitting optical radiation. The first ends of the fibers form a fiber array having a first pattern. There is a guiding means disposed in the holder at predetermined positions with respect to the fiber array; and an opto-electronic board consisting of an opto-electronic device array monolithically formed on a semiconductor chip with the same pattern as the first pattern of the fiber array, with aligning means formed on the chip. The aligning means are disposed at substantially the same predetermined positions with respect to the array of opto-electronic devices as the positions of the guiding means relative to the fiber array, and the aligning means receives the guiding means so as to mechanically align the opto-electronic device array with the optical fiber array, whereby each opto-electronic device is aligned to an optical fiber, so that the opto-electronic device emits optical radiation into the fiber array or receives optical radiation from the fiber array.

SUMMARY OF THE INVENTION

The minimal device fundamental to the invention consists of a semiconductor photo-array on a silicon substrate with special enhancements. There is fabricated within the silicon circuitry in the substrate the capability to sense the signal strength received at each detector, and to make it available for interpretation in software for mapping of viable optical connections. The circuitry further provides for control through software for selectively switching and testing the routing or connections between detectors and emitters within a transceiver array or between the emitters and detectors of two, optically connected arrays. The circuitry may be enhanced, further extending the functionality and benefits of the invention, by incorporating software control inputs for adjusting the sensitivity or gain of each detector, and for selectively switching power off and on to each of the emitters and detectors.

For the purpose of this disclosure, terms other than "mapping", such as configuring or switching, relate to the act of creating or altering all or part of a signal circuit path or channel. The term "mapping," means generally to confirm what is the fully defined present set of connected points or links of each circuit path or channel of a single or multi-channel system. The term "map" or "mapping" or "re-map" or "re-mapping," where the context admits, may include a reconfiguration or switching of one or more circuit paths within the system of interest, along with a new confirmation or mapping of what is the resulting new set of circuit paths or channels.

The methodology of the invention applicable to a single photo-transceiver array, facilitated by the software and circuitry described above, is the process of routing and rerouting the data transfer channels within a photo transceiver array to overcome device or system defects or failures and provide special operational flexibility, as will be better appreciated when the method is practiced at the next level of complexity.

The methodology of the invention, applied on a larger scale, provides for routing and mapping the data channels of a multi-array opto-electronic semiconductor device, including the intra-nodal connections and the inter-nodal connections that define each data channel or path through the device, for one or a multitude of purposes, including: adaptation to faulty, redundant, or missing connection paths resulting from lateral or rotational misalignment of arrays; isolation of defective emitters, detectors, and fiber optic strands; power and heat management; and time-based multiplexing of channel routing for security purposes.

The necessary software and silicon circuitry are initially employed to map a first order set of possible data channels between adjacent nodes and within nodes in the device, selecting out defective emitters, detectors or faulty fiber optic connections, and allocating from among the remaining possibilities a rule-based assignment of connection paths, forming a suitable operational channel set or map for data transfer. The rule may take into account any of several variables of interest in the specific application such as position, signal strength at the detector, plurality of detectors seeing a given emitter, non-useful emitters, architecture of the device or system, and the like.

The invention generally relies on a technique called over sampling, assuming there will be a surplus of detectors available for mapping of optical connections to accommodate misalignment of emitters to detectors and variable topologies, and for mapping and re-mapping of inter and intra-nodal connections for security, power management, and fault correction purposes.

It is an objective of the invention to provide a process for automatically configuring point-to-point connections between semiconductor photo arrays for increased alignment tolerance. It is a further objective to provide a process for automatically configuring point-to-point connections between the detectors and emitters of each semiconductor photo-transceiver array for better fault tolerance and security of data.

It is yet another objective to provide a way of operating such devices at less than maximum power consumption during routine operation, while providing for increased bandwidth during peak data-transfer demand times. It is also an objective of the invention to provide a process of automatically configuring data channel connections within the device or system so as to significantly increase fan out of an emitter signal to facilitate the mapping of star and ring topology devices, and such other complex topologies as may become useful in the development of such devices, for all the same advantages.

An additional objective of the invention is to provide for pixel re-mapping for increased reliability and security of data transmission, for re-routing if a fiber breaks, to improve the reliability and security of transmitted data, and for power reduction and bandwidth management across the global connection map.

Another additional objective is to provide for a useful distribution, such on a proximity-based or generally uniform distribution basis, when using a limited data channel set of emitter and detector allocations within the available array space, for more uniform power and heat distribution across the substrate. A still further objective is to provide means for allowing only the minimum amount of power needed to support the limited channel set, instead of powering connections that are not aligned usefully, or are not presently needed in the device topology. Another objective is to use smaller amounts of power during normal operations by turning some useful emitter-detector pairs off, but providing higher throughput during peak demand by turning all useful emitter-detector pairs on for short periods of time.

Other advantages and objectives will be apparent to those skilled in the art, based on the drawings, description of preferred embodiments, claims, and abstract that follow.

DESCRIPTION OF THE PREFERRED EMBODIMENT

The invention is susceptible of many embodiments, both as to apparatus and method. The novel and fundamental devices of the invention are fabricated by techniques known to those skilled in the art, based upon introducing the additional capabilities of the invention described and illustrated through out this disclosure, at the design stage. The modifications to the circuitry in the silicon substrate provide for (a) the sensing of photo-detector signal levels and testing of detector to emitter electrical connections, (b) the necessary control inputs, and (c) the software interface necessary to enable a control program to effectuate the methods of the invention. The controllable silicon circuitry of the photoarray, presumably CMOS although the invention is not thereto limited, includes that necessary to adjust each detector's gain, switch power on and off to any of the emitters and detectors, and to reroute or multiplex the routing of detector outputs among two or more emitters.

Providing the necessary circuitry to rewire, connect or route any detector to any emitter in the array, while within the scope of the invention, becomes exponentially more challenging as the density and size of the array increases. For this reason, the rerouting capability may be limited, such as on a proximity basis as to a few additional emitters adjacent to the default primary emitter assigned by design to a given detector, or on a row or column basis, depending on the overall layout of the chip. The controlling software for effectuating the steps of the invention through the controllable circuitry may be integrated with the circuitry, or connected from an external source, or divided. The division between on-board logic and computing power, and an external software program, is discretionary to the designer and will likely vary with the specifics of the application and the limits of the related technologies.

Figure 1:
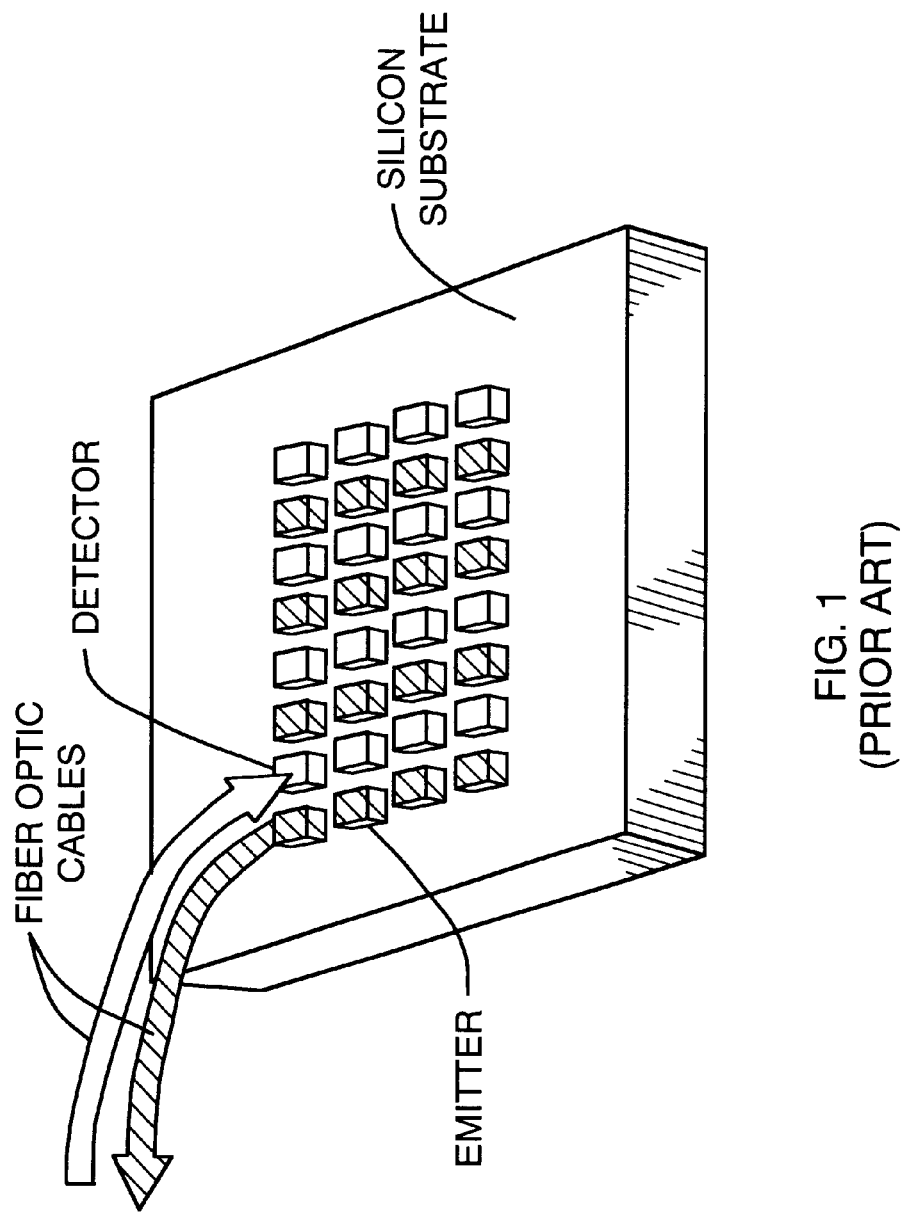
FIG. 1 is a simplified representation of a prior art photo transceiver array on a silicon substrate, with alternate columns of photo emitters and detectors, the array being connected to a further array or device by a bundled fiber optic cable transceiver pair.
Figure 2B:
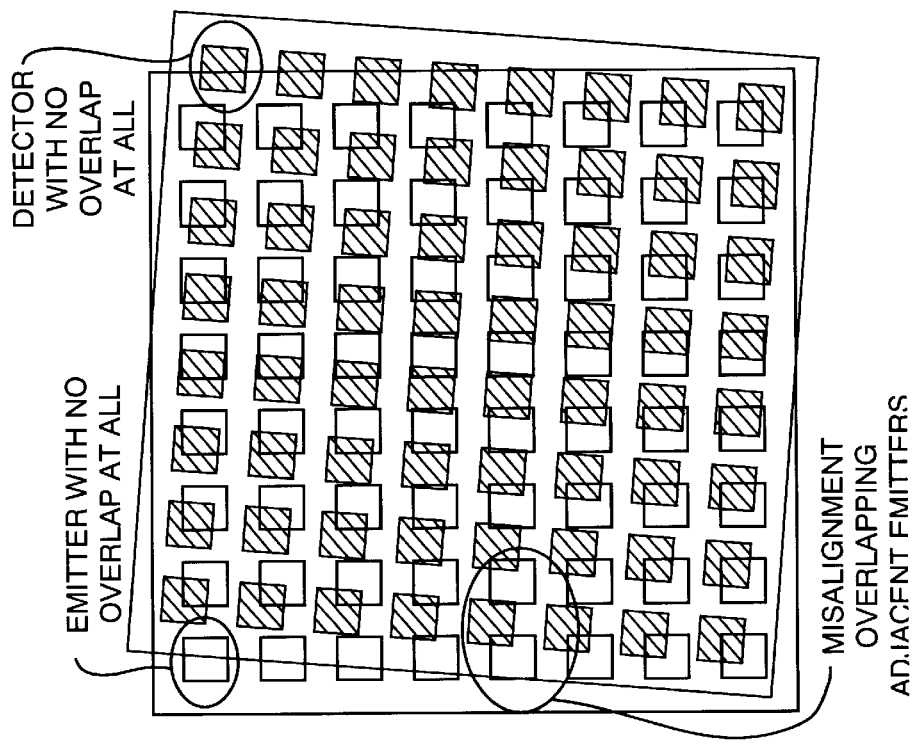
FIG. 2 is a simplified representation of misalignment errors between two sets of photo-arrays common in the prior art; the FIG. 2A set illustrating insufficient overlap between emitter and detector, resulting in degraded functionality of the emitter/detector pair, and the FIG. 2B set illustrating misalignment where adjacent emitters partially overlap a common detector, and misalignment where some detectors have no overlap and no functionality.
Figure 2A:
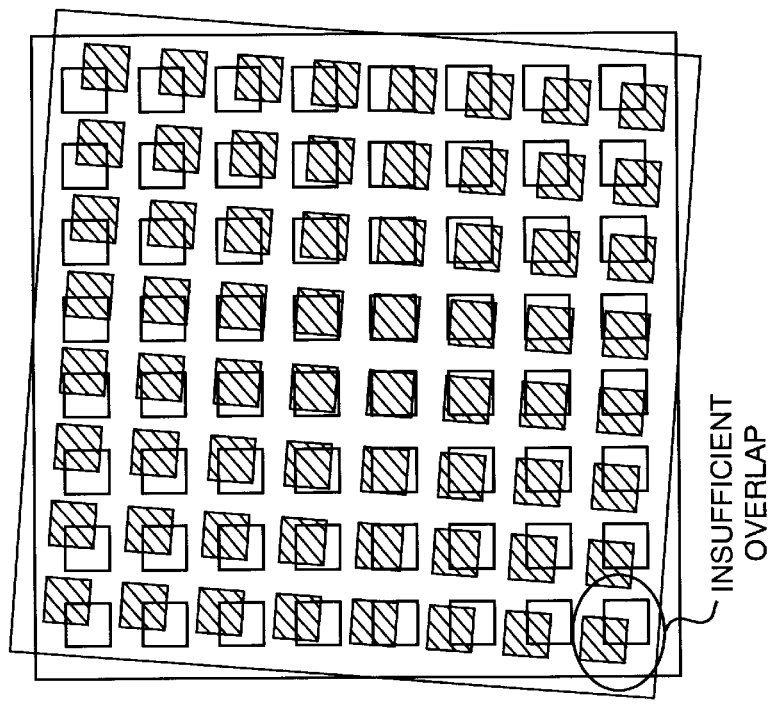
Figure 3A:
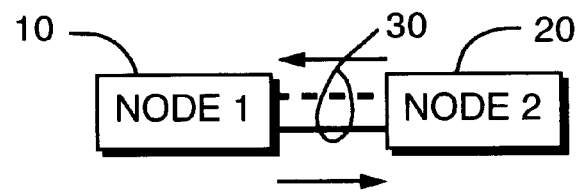
FIG. 3A being the schematic representation, and FIG. 3B being a visual depiction.
Figure 3B:
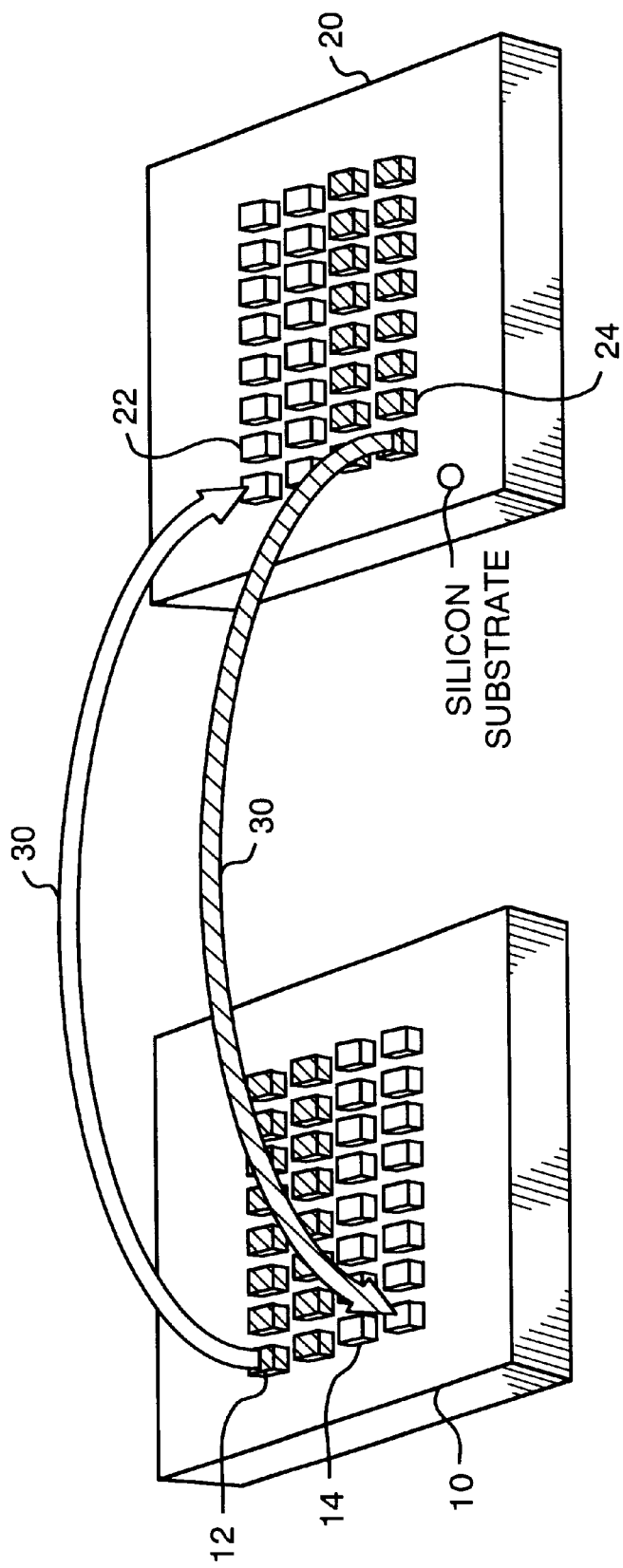
FIG. 3 is a simplified representation of an inter-nodal connection pair between two arrays or nodes via a fiber optic bundle.

A preferred embodiment method is described for automatically configuring point-to-point connections between two arrays, utilizing the technique of over-sampling, as disclosed here and in FIGS. 3A and 3B.

FIGS. 3A and 3B show a simplified diagrammatic presentation of the invention. The structure of FIG. 3B consists of two arrays of transceivers 10 and 20, comprising flip-chip mounted transmitters or receivers on a silicon substrate with CMOS peripheral circuitry, along with a communication means connecting the transmitters 12 on array 10 to detectors 22 on the other array, and the transmitters 24 on array 20 to detectors 14 on the first array. FIG. 3A is a functionally equivalent block diagram of the structure of FIG. 3B. For simplicity, only a single fiber pair 30 is shown. The communication means could be a fiber optic bundle or other point-to-point communication means. Although the figure shows separate arrays of emitters and detectors, the invention applies to inter-digitated emitters and detectors as well. For simplicity, only one emitter in an array on each substrate is shown as being connected to a detector in an array on the other substrate. Of course each emitter in each array is nominally connected to a unique detector in the other array by a fiber optic strand; a single fiber bundle pair is shown here for clarity.

The preferred method of the invention for automatically configuring and mapping of point-to-point connections between two arrays of transceivers, simply stated, consists of the following steps:
1. Turning on one emitter in the first array, and determining which detector or detectors in the second array senses it. If no detector senses the light, then the emitter in the first array is declared non-useful.
2. If only one detector senses the light from the emitter in the other array, then that detector is identified as being associated with the first emitter from the first array.
3. If more than one detector senses the light from the emitter in the first array, then all of the detectors that detected the light from the emitter in the first array are designated as possible receivers.
4. Steps (1) thru (3) are repeated for the remaining emitters of the first array.
5. In the case where more than one detector senses the light from the emitter in the first array, then the detector that detected the strongest signal is designated as the detector corresponding to that emitter.

It will be apparent that step 5 is the application of a preselected rule for resolving a greater number of point to point paths. Other rules could be substituted. Of course, one could stop at step 4, selecting only associated emitter/detector sets for use if sufficient channels are available for the intended purpose; however the user would be denied, at this stage, most of the benefits of the invention. Assuming the rule-based selection process of the step 5 cases is suitably executed, steps 1–5 result in a first full round assignment of all unambiguous one to one connections or links between emitters of the first array and detectors on the second array.

Several approaches for achieving step 5 case resolutions are possible, all within the scope of the invention. For example, the receiver circuitry has gain elements that amplify the current generated by the incoming light. The gain can be adjustable so that the circuitry can be optimized for either low or high light conditions. The gain is typically adjustable to 32 levels. Step #1 of this embodiment would likely have some input pattern such as '0-1-0-1', and the gain of each receiver would be set at the lowest level and then increased slowly through the software and control circuitry. If light hits that detector, then at some gain level, the detector will register the light; in this example, the '0-1-0-1' pattern. What is sought is to find the detector that registers the pattern for the lowest gain level, which would correspond to the detector that had the greatest amount of light hitting it.

If multiple detectors see the same amount of light, then one can be chosen by a suitable positional rule of default; for example, the one most toward the upper right corner of the array is selected. An alternative primary or default rule would sense directly which detector received the most photonically generated photocurrent by accepting photocurrent from each detector which would charge up, for example, an analog-to-digital converter, to get a numerical value for the light hitting that detector. The detector that registered the highest numerical value for photocurrent would be the winner.

Continuing now with the methodology above:
6. If more than one emitter maps to multiple detectors and some, but not all, of the detectors sense light from more than one emitter, then the unique configurations are selected out first. Some rule-based approach such as a top-left choice may be used, or one might pick the pixels that spread the 'good' pixels out as much as possible to inhibit any tendency for cross talk between adjacent detectors.
7. When there are detectors in the first array and emitters in the second array (whether inter-digitated or not), steps (1) thru (6) are repeated in the reverse direction.

An alternative to step 5, is that all of the detectors that sensed light from a particular emitter in the first array are lumped together, replicating the received signal. This alternative would make the invention highly tolerant to extremes of vibration and thermal cycling, at least with respect to the receiving array, and the system would be far more tolerant to any system misalignment of emitter/detector connections during operation due to environmental factors.

Configurations having more than the required number of detectors for the necessary number of emitters, enable a technique called over-sampling, which is employed in the embodiment that follows. FIG. 4 shows how the present invention works for the simple case of determining the mapping of three emitters in a first to three detectors in a second array, using a 1×4 array of emitters in Node 1 and a 1×4 array of detectors in Node 2. The sequence of FIGS. 4A to 4D show each emitter of Node 1 being turned on sequence, and which detectors of Node 2 see the light.

Figure 4C:
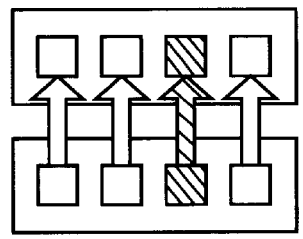
FIG. 4 is a simplified sequential representation of the mapping of an emitter array to a detector array, to establish a limited connection set or map, the sequence running from FIG. 4A–FIG. 4D, with the final mapping configuration shown in FIG. 4E.
Figure 4E:
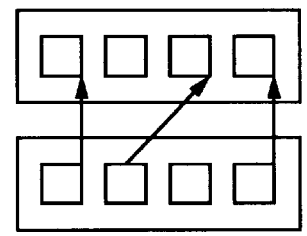
Figure 4B:
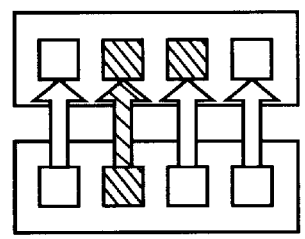
Figure 4A:
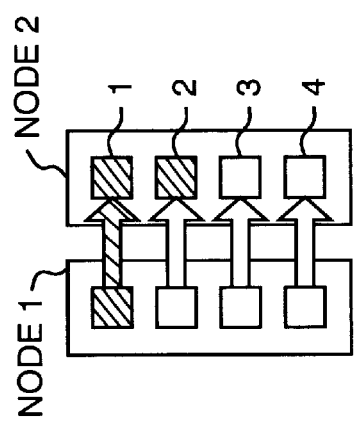
Figure 4D:
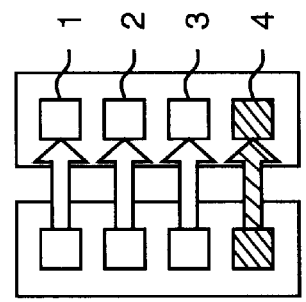

FIG. 4A shows emitter 1 of Node 1 being turned on and light from that emitter being detected by the detectors 1 and 2 of Node 2. Thus, emitter 1 could be mapped as an optical interconnect line to either detector 1 or detector 2. In FIG. 4B, only emitter 2 is on, and light from that emitter is sensed by detector 2 and detector 3. Thus, emitter 2 could be mapped to either detector 2 or detector 3. In FIG. 4C, only emitter 3 is on, and light from that emitter is sensed only by detector 3 of node 2. Therefore, emitter 3 can be mapped to detector 3 only. In FIG. 4D, only emitter 4 is on, and light from that emitter is sensed by detector 4 only.

Since detector 2 is illuminated by emitter 1 and emitter 2, it cannot be used to form a unique mapping of the emitters to the detectors. Likewise, since detector 3 is illuminated by emitter 2 and emitter 3, emitter 3 cannot be used to form a unique mapping. However, detector 4 sensing emitter 4 is unique and must be used. Also, detector 1 senses light only from emitter 1, and hence this mapping should also be used. Emitter 2 is mapped to detector 3 to avoid cross talk, since detector 2 also senses emitter 1. Thus, the final mapping configuration of optical interconnect lines is as shown in FIG. 4E.

However, note that if the light sensed by detector 2 from emitter 1 were sufficiently small as compared to the light detected from emitter 2, then it would not cause enough of a cross talk problem to interfere with using detector 2 for emitter 2. Thus, the explanation above is correct for cases where the light sensed by two detectors is roughly equal, in other words, detectors 1 and 2 see about the same light with emitter 1 on. Where this is not the case, for example if detector 2 sees a very small ratio, say one-tenth, of the light seen by detector 1 when emitter 1 was on, and detector 3 sees only one-tenth the light of detector 2 when emitter 2 was on, then one could map emitter 1 to detector 1, emitter 2 to detector 2 and emitter 3 to detector 3 without worrying about cross talk.

One-tenth is not a critical ratio but is used simply to illustrate that in cases where the detector and related circuitry can clearly distinguish between a good signal and a weak signal, the weak signal can be disregarded. In this case, if the amount of light hitting detector 2 when emitter 1 was on is much less than the amount of light hitting detector 2 when emitter 2 is on, so that one can distinguish between emitter 1 and emitter 2, then by setting the gain level on detector 2, one can program detector 2 to ignore the light from emitter 1 and only switch at the higher light level of emitter 2.

Once the inter-nodal mapping is complete, power to the unused emitters and detectors can be turned off. For example, in FIG. 4, we only wanted to transmit three channels even though our array could, in principle, support four pixel channels. One can save power by finding the pixels which optimize the three channel data transfer and, in this case, turn off emitter 3 of Node 1 and detector 2 of Node 2, thereby saving considerable power over the case where all of the devices are powered up with less than all devices being used.

The emitters and detectors switch at gigahertz rates, so the entire mapping process takes a very short amount of time, even for large arrays. In the example cited, there was only one unused emitter and one unused detector. In practice, arrays as large as 256×256 emitters and 640×480 detectors have been made. To ensure that such large arrays with large numbers of available channels can be captured, a sufficient over-sampling ratio is required. In the example shown in FIG. 4, a 33% over-sampling was used; 4 pixels for 3 channels. This 33% over-sampling rate is sufficient for most arrays envisioned at present. Note that for larger arrays, smaller over-sampling rates are required because typically as two-dimensional array sizes get larger, there is a greater chance of a pixel receiving some light. Also as the number of available receiver gain levels increases, providing better discrimination capability, the required over-sample ratio goes down.

In addition, in applications where system integrity is particularly important, it may be useful or necessary to ensure that the auto-configuration process produced a mapping with more than the required number of emitter-detector pairs so that if some of the emitters or detectors failed, there are other emitter/detector pairs available to take the place of the failed emitters or detectors.

Figure 5:
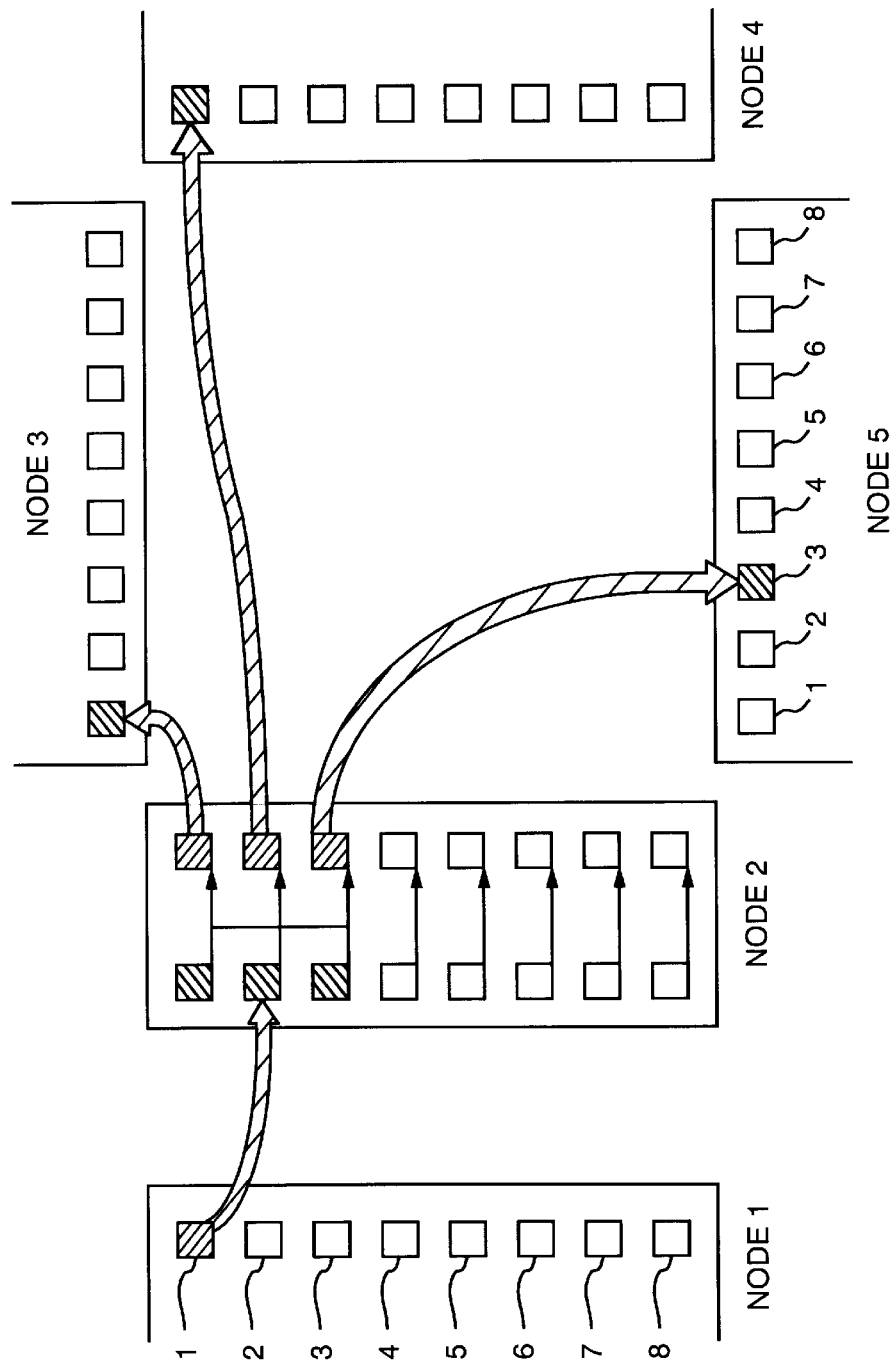
FIG. 5 is a simplified representation of emitter to multi-detector mapping from a single emitter signal, enabling a fan-out capability or star-type architecture of a multi-array configuration.

In a further preferred embodiment of the invention, the methodology extends to mapping large fan-out and star type architectures. The mapping of a single emitter to more than one detector can be exploited intentionally as a means of achieving fan-out. Referring now to FIG. 5, the present invention is illustrated as it applies to accomplish fan-out to more than one other transceiver array. The process of automatically configuring point-to-point connections is used to establish the mapping of Node 1 to Node 2 where a connection to any of the first three detectors of Node 2 results in the first three emitters of Node 2 being turned on. These emitters in turn are connected to other nodes, thereby demonstrating fan-out capability of the present invention. This embodiment also describes how the present invention can be used to render a star architecture more tolerant of misalignment. Node 2 of FIG. 5 acts like the central node for a star coupler, where nodes 1,3,4, and 5 represent leaves of the star.

Figure 6:
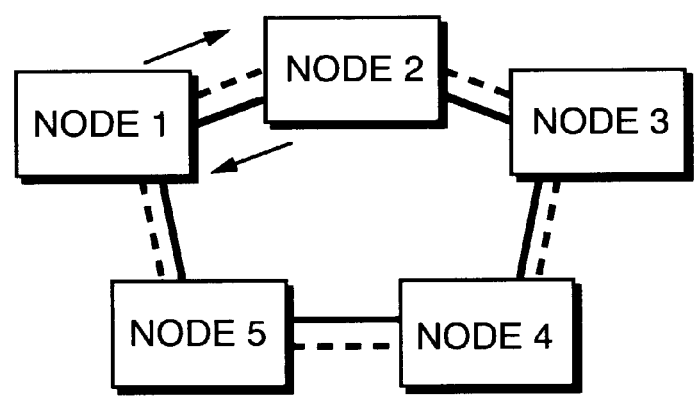
FIG. 6 is a simplified schematic representation of a ring-type array architecture device, to which the methodology of the invention is also applicable.

In a variation or extension of the methods of FIGS. 4 and 5, the point-to-point configuration of the optical interconnect lines can be applied sequentially from node to node. FIG. 6 illustrates a 5-node system in ring architecture, to which the invention is applicable. The method for configuring the emitter-detector mapping for a ring architecture consists of the following steps:

(1) Apply the point-to-point configuration procedure to the emitters in Node 1 and the detectors in Node 2.
(2) Apply the point-to-point configuration procedure to the emitters in Node 2 and the detectors in Node 1.
(3) Repeat steps (1) and (2) sequentially around the ring to determine unique configurations for each node pair.

There is now described a significant extension or alternate preferred embodiment of the methodology of the invention, providing opportunities for enhanced security and other benefits, which includes provisions for automatically changing the intra-nodal configuration of detectors to emitters within one or more of the arrays or nodes of a multi-array device or system, at predetermined intervals. The process involves the following steps:

(1) Mapping the connections of each detector to each emitter within each array, so that there is a known one-to-one mapping of the intra-nodal connections as well as the inter-nodal, or array to array connections of the data transmission system;
(2) At a calculated or predetermined interval, changing the data routing scheme by switching the routing of some or all of the detector-emitter data transfer connections at one or more nodes in the data transmission process, and remapping the system.

For example, instead of automatically re-transmitting the data out using the transmitter immediately next to the detector that received the data, the data could be routed to another transmitter. Then the data could be re-routed again.

Figure 7:
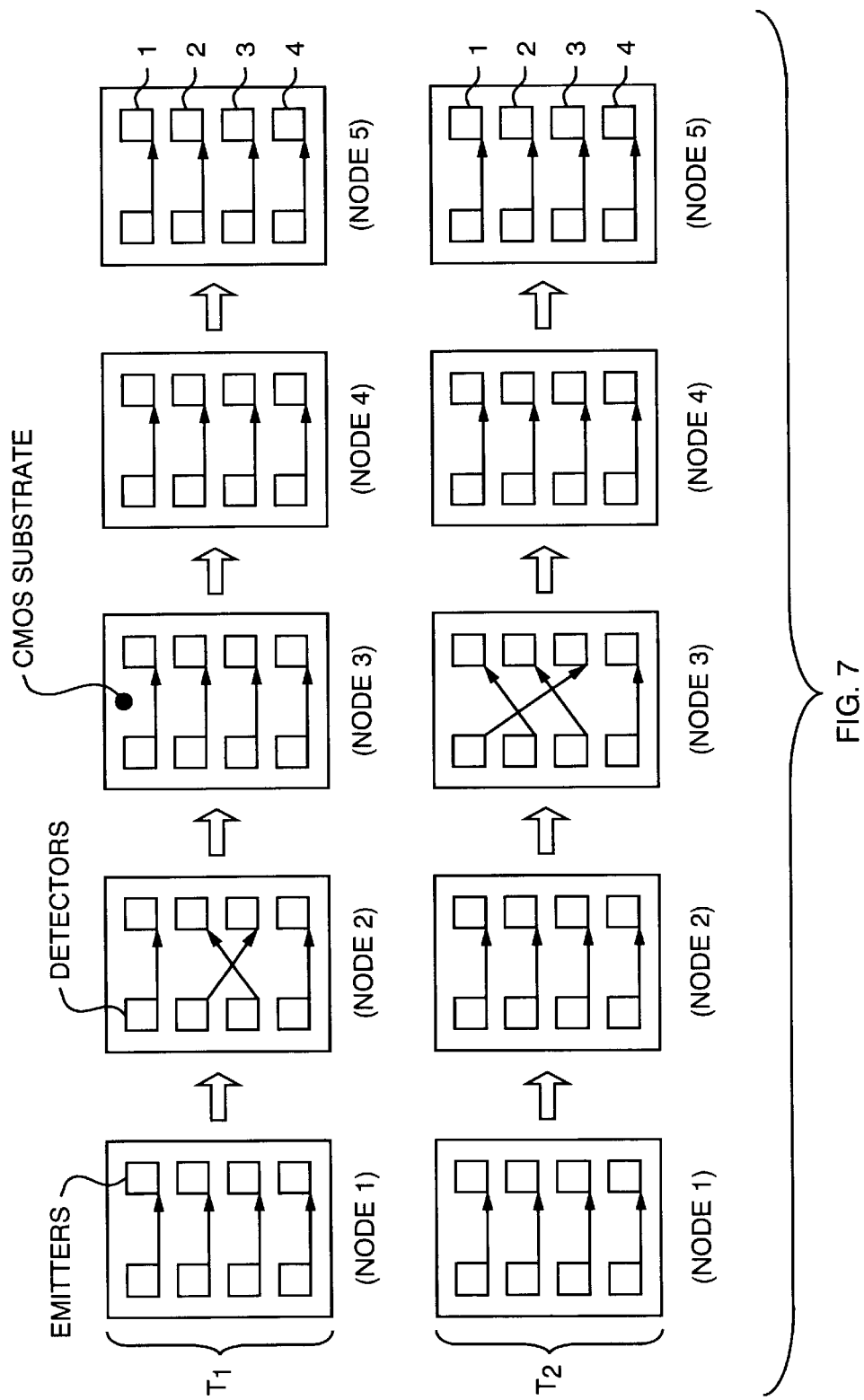
FIG. 7 is a simplified sequential representation of the mapping and re-mapping of the detector to emitter intra-nodal connections of a 5 node chain of optical transceivers, illustrating a first full connection map and a subsequent reconfiguration of the connection map where Nodes 2 and 3 have been functionally rewired with CMOS silicon substrate circuitry and software to alter the original detector-emitter mapping.

FIG. 7 shows an example of the use of intra-nodal detector/emitter switching of the routing links at selected nodes to enhance the level of security or confidence that a given set of data being transmitted cannot be readily accessed or decoded by unauthorized third parties. A fully functional 1×4 bit array is shown for simplicity. It can be assumed that different size arrays may be used, with inactive or unused emitters as described above. In this simplified example, data is being transferred from Node 1 to Node 5. In the top row, according to a first configuration map being utilized at time T1, data is cross-routed between adjacent emitters 2 and 3 in Node 2 before it is transmitted to Node 3. At some other time T2, shown in the bottom row, the cross routing within Node 2 is reversed so that data flow is "normal", being transferred from detectors to adjacent or default emitters. However, also at T2, the data routing in Node 3 is re-formed from the T1 mapping to create new routing links connecting detector 1 to emitter 3, detector 2 to emitter 1, and detector 3 to emitter 2.

Chip topography and circuit design limitations may restrict the number of emitters to which connections from any one detector may be mapped, particularly in large arrays. Even a small subset of available emitters connectable to a given detector, or a convenient, repetitive grouping of detectors and emitters within which such multiplexing is available, provides very significant advantages. The intra-nodal re-routing procedures can be initiated and conducted according to an infinite variety of schemes or rules, but is effectuated in accordance with the invention by using the software in conjunction with the silicon circuitry sensing and control points described. Re-routing can be done after a pre-determined number of clock cycles, including verification that the counter value was valid, or at specified intervals, or when a particular bit in an array became active, and so on. For most of these timing methods, a synchronized clock for all of the nodes is required.

More than one intra-nodal re-routing can be carried out in a given re-mapping exercise. For example, all but the last detector in an array can be re-routed to all but the first emitter. Then, the last detector could be routed to the first emitter. More than one node can be directed to re-route or re-map the data transfer, and the extent of the re-routing depends only on the number of available bits that can be permuted. False data mapping can also be employed, i.e., data could be sent to a known non-functional detector (with redundancy provided elsewhere in the system) so that if the data were being monitored, there would be spurious noise present in the signal.

Figure 8B:
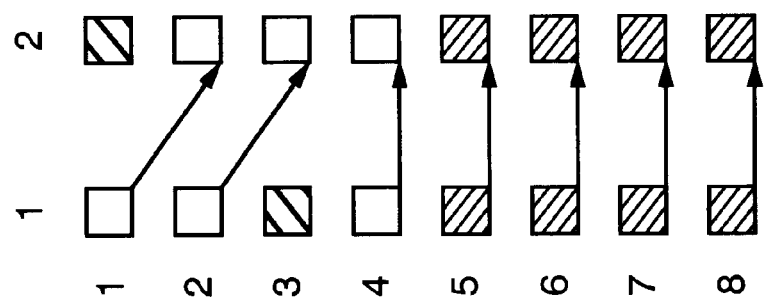
FIG. 8 is a simplified sequential representation of emitter array to detector array re-mapping of the inter-nodal channel map of FIG. 8A, to replace a faulty fiber optic strand from emitter 1 to detector 2, configuring out the faulty connection and allocating a previously unused connection to redefine the channel map as shown in FIG. 8B.
Figure 8A:
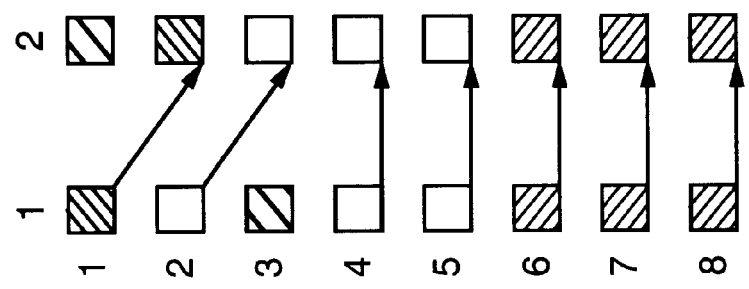

A yet further embodiment of the invention provides tolerance for disruptions in the integrity of some of the inter-nodal emitter-detector optical connections, as in the event of a failed fiber optic connection, and also for the possible failure of an emitter. FIGS. 8A and 8B show a sequential inter-nodal re-mapping of a 1×8 array 1 of emitters to a 1×8 array 2 of detectors, originally mapped to accommodate a non-functional emitter 3 and non-functional detector 1. As is illustrated, the remaining detectors and emitters of the first 4 of each, have been auto-aligned so that a 1×3 subset of the emitters has been mapped to a 1×3 subset of the detectors, which is all that is required of this channel map at this time. In addition to the 1×3 subset, another four emitter-detector pairs have been mapped so that if any of the emitters or detectors or the optical connections in the original 1×3 subset fails, a replacement channel is available. The original auto-alignment results are shown in FIG. 8A.

If, for example, during the course of operation the first emitter fails, then that emitter and the corresponding detector are no longer available for use. Upon recognition of the failed connection through the circuitry and software or though data channel monitoring means external of the invention but communicating with or recognized by the software control program, re-mapping is executed, the results being illustrated in FIG. 8B. The preferred embodiment methodology of the invention relating to this aspect of the invention consists of the steps of:

(1) Automatically configuring point-to-point connections as previously described to define a full configuration map;

(2) Using the system as designed;

(3) Periodically or continuously testing through the circuitry and software of the invention to see if an emitter to detector connection has failed:

(4) If a failure has occurred as indicated by the testing or from an external indicator, then automatically configure point-to-point connections again and remap the system;

(5) If there has been no failure, continue using the original system configuration map.

An alternate method or process for implementing this re-mapping consists of the steps of:

(1) Automatically configure point-to-point connections and map a current system configuration, incorporating information about any un-used but functional emitter-detector pairs as ready replacements within the configuration map, for substitution where suitable without requiring system wide remapping;

(2) Use the system as designed;

(3) Periodically test to see if an emitter-detector connection has failed;

(4) If a connection has failed, then designate one of the functional un-used emitter-detector pairs as a replacement, so long as unused emitter-detector pairs recognized in the first system mapping are available and suitable for the required substitution, and continue data transfer operations per the same system configuration map;

(5) If there has been no failure, continue using the step 1 system configuration map FIG. 8 also demonstrates a way of using the present invention to reduce power requirements during routine operation. This method consists of the steps of:

(1) Automatically configuring point-to-point connections adequate for off-peak performance, and saving information about any un-used but functional emitter-detector pairs and switching off power to these emitters and detectors;

(2) Using the system as designed;

(3) During peak demand times, switching on power and using the additional emitter-detector pairs to supplement data throughput.

An alternate step (3) to the above method that exercises all available connections, is to cycle repetitively through the available, functional emitter-detector pairs, switching power and transmission duty of each emitter-detector pair on and off periodically on a time share basis, so that the heat generated is more uniformly distributed throughout the transceiver array.

It will be readily apparent that the exercise of the methodology of the invention requires a correspondingly capable device or system. Accordingly, there is an example within the scope of the invention, a photo-transceiver semiconductor array of photo emitters and detectors and supporting circuitry fabricated on a silicon substrate, with a capability in the supporting circuitry for forming and un-forming an electrical circuit between a detector and at least one emitter. It may have circuitry for sensing signal current in the electrical circuit, as well as for sensing signal light level at the detector. It may have circuitry for adjusting the gain of each detector of the array, and for switching power between on and off for the detector or the emitter or both.

As a further example of a device or system of the invention, there may be included or associated with the device or system a software control program and implementing circuitry for receiving input from the supporting circuitry in the silicon substrate of the array that is sensing the signal current and the signal light level in the electrical circuits between detectors and emitters. The software through its implementing circuitry may also control the supporting circuitry in the silicon substrate that adjusts the detector gain and switches power to the detectors and emitters, and also control the supporting circuitry that forms and un-forms the electrical circuits between the detectors and emitters.

In summary, according to the invention, silicon circuitry in the substrate of a photo transceiver semiconductor array is provided for sensing the received light signals and signal levels of all photo-detectors, switching power on and off to each optical unit, meaning all photo-emitters and photo-detectors whether one or both are present on the chip, adjusting the sensitivity of each detector, and selectively and repetitively forming or routing and testing or sensing new detector to emitter electrical connections within each array. These hardware sensing, testing, and control capabilities are interfaced with a suitable software control program or programs, whether local or remote, to exercise the control functions described herein on the photo emitters and detectors of a device or system using one or more of such photo-transceiver arrays. When combined with the technique of over-sampling, where arrays are provided that have surplus emitters and/or detectors relative to the total bandwidth requirement of the application, the invention thus enables system mapping, monitoring and selection of available emitter to detector inter-array optical connections, and routing or multiplexing of detector to emitter internal array connections whenever needed or desired, for configuring and controlling the data transfer channels through a single node or multi-node optical transmission semiconductor device.

A host of advantages and benefits derive from this capability, including: the ability to adapt and correct for misalignment of mating transceiver arrays; the ability to bypass or isolate faulty emitters, detectors, internal connections and optical connections; the ability to exercise power management within the device and gain more uniform heat dissipation across each chip; and to engage in enhanced security modes for routing and re-routing the data streams.

Other and various embodiments within the scope of the invention illustrated, disclosed and claimed herein will be readily apparent to those skilled in the art.

What is claimed is:

1. A method for mapping at least one data transfer channel within a system comprising first and second arrays of transceivers, said first and second arrays of transceivers each comprising at least one emitter and at least one detector, said method comprising:

activating a first said emitter in said first array of transceivers;

scanning each said detector in said second array of transceivers, said second array of transceivers being optically coupled to said first array;

recognizing if at least one said detector in said second array receives light emitted from said first emitter in said first array of transceivers;

identifying each said detector in said second array of transceivers that receive light enmitted from said emitter;

repeating said process for each said emitter in said first array of transceivers;

establishing at least one unique inter-nodal optical interconnect between said first and second arrays;

mapping at least one intra-nodal electrical routing link between said at least one emitter and said at least one detector of said first array; and constructing a map of said data transfer channel.

2. The method according to claim 1 wherein said intra-nodal electrical routing link is mapped according to a method comprising:

forming a connection between said at least one detector and said at least one emitter, said at least one detector and said at least one emitter being located in a single array or transceivers;

testing said connection and designating said connection as functional or nonfunctional;

identifying a functional connection as one said intra-nodal electrical routing link corresponding to said detector and identifying said emitter as unavailable to other said intra-nodal electrical routing link; and repeating said steps of forming and testing a connection with each said emitter in said single array.

3. The method according to claim 1 further comprising: re-routing said intra-nodal electrical routing link, thereby reconfiguring said data transfer channel.

4. The method according to claim 1 further comprising:

monitoring for an occurrence of an event and upon said occurrence;

re-mapping said inter-nodal optical interconnects, re-mapping said intra-nodal electrical routing links, and re-configuring said map of said data transfer channel.

5. The method according to claim 4 wherein said system comprises a plurality of said data transfer channels, and said method further comprises repeating said steps of re-mapping said inter-nodal optical interconnects, re-mapping said intra-nodal electrical routing links, and re-configuring said map or said data transfer channel, for each said data transfer channel in said system.

6. The method according to claim 4 wherein said event comprises a passage of a predetermined number of clock cycles.

7. The method according to claim 4 wherein said event comprises a detection of a fault in at least one said transceiver and/or said optical interconnect.

8. The method according to claim 4 wherein said event comprises a detection of a fault in at least one said intra-nodal electrical routing link.

9. The method according to claim 4 wherein said event comprises a dynamic topology change within said system.

10. The method according to claim 4 wherein said event comprises a change in bandwidth requirements.

11. The method according to claim 4 wherein said event comprises a receipt of sensor data relating to power management considerations.

12. The method according to claim 1 further comprising mapping at least one intra-nodal electrical routing link between said at least one emitter and said at least one detector of said second array.

13. A system for the transmission of data via photo-transceiver arrays, said system comprising:
   a plurality of arrays, each said array comprising transceivers and supporting circuitry;
   at least two said arrays being optically coupled;
   a means for mapping at least one intra-nodal electrical routing link between said transceivers in said arrays, and establishing at least one unique inter-nodal optical interconnect between said plurality of arrays, and constructing a data transfer channel map; and
   a means for monitoring for an occurrence of an event, and upon said occurrence, re-mapping said at least one inter-nodal optical interconnect, re-mapping said at least one intra-nodal electrical routing link provided by said supporting circuitry, and re-configuring said data transfer channel map.

14. The system according to claim 13 wherein said event comprises a passage of a predetermined number of clock cycles.

15. The system according to claim 13 wherein said event comprises a detection of a fault in at least one said transceiver and/or said optical interconnect.

16. The system according to claim 13 wherein said event comprises a detection of a fault in at least one said intra-nodal electrical routing link.

17. The system according to claim 13 wherein said event comprises a dynamic topology change within said system.

18. The system according to claim 13 wherein said event comprises a change in bandwidth requirements.

19. The system according to claim 13 wherein said event comprises a receipt of sensor data relating to power management consideration.

20. The system according to claim 13 wherein said means for mapping and said means for monitoring are selected from the group consisting of hardware, software, firm ware, and combinations thereof.

* * * * *